( 12 ) United States Patent
Matsumura et al.

(10) Patent No.: US 12,205,350 B2
(45) Date of Patent: Jan. 21, 2025

(54) APPARATUS FOR SEPARATING FEATURE POINTS FOR EACH OBJECT, METHOD FOR SEPARATING FEATURE POINTS FOR EACH OBJECT AND COMPUTER PROGRAM (71) Applicant: NIPPON TELEGRAPH AND TELEPHONE CORPORATION, Tokyo (JP)

(72) Inventors: Masaaki Matsumura, Musashino (JP); Hajime Noto, Musashino (JP); Yoshinori Kusachi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 340 days.

(21) Appl. No.: 17/800,582

(22) PCT Filed: Feb. 20, 2020

(86) PCT No.: PCT/JP2020/006844
§ 371 (c)(1),
(2) Date: Aug. 18, 2022

(87) PCT Pub. No.: WO2021/166174
PCT Pub. Date: Aug. 26, 2021

(65) Prior Publication Data
US 2023/0101653 A1    Mar. 30, 2023

(51) Int. Cl.
*G06V 10/77*    (2022.01)
(52) U.S. Cl.
CPC ............................. *G06V 10/7715* (2022.01)

(58) Field of Classification Search
None
See application file for complete search history.

(56) References Cited

U.S. PATENT DOCUMENTS

| | | | |
|---|---|---|---|
| 12,094,159 B1* | 9/2024 | Akbas | G06V 40/20 |
| 2021/0049356 A1* | 2/2021 | Gu | G06V 40/10 |
| 2024/0252841 A1* | 8/2024 | Labarbe | A61N 5/1031 |

OTHER PUBLICATIONS

Cao et al., "OpenPose: Realtime Multi-Person 2D Pose Estimation using Part Affinity Fields," arXiv:1812.08008 (Year: 2018).*

(Continued)

*Primary Examiner* — Soo Shin (57) ABSTRACT

An object-specific keypoint separation apparatus includes: an inference execution unit configured to receive a captured image capturing an object as an input and use a pre-trained model that has been trained in order to output a plurality of first maps and a plurality of second maps generated from the input captured image to output the plurality of first maps and the plurality of second maps, the plurality of first maps storing a vector describing a connection relationship of a keypoint of the object only around the keypoint, and the plurality of second maps representing a heat map configured to have a peak at coordinates at which the keypoint of the object appears; a map correction unit configured to correct the plurality of second maps using the plurality of first maps and the plurality of second maps; an upsampling unit configured to upsample the plurality of first maps; and an object-specific keypoint separation unit configured to separate keypoints for each object based on the plurality of upsampled first maps and the plurality of corrected second maps.

6 Claims, 7 Drawing Sheets

(56) References Cited

OTHER PUBLICATIONS

Papandreou et al., "PersonLab: Person Pose Estimation and Instance Segmentation with a Bottom-Up, Part-Based, Geometric Embedding Model," arXiv:1803.08225v1 [cs.CV] Mar. 22, 2018 (Year: 2018).*

Zhe Cao et al., OpenPose: Realtime Multi-Person 2D Pose Estimation using Part Affinity Fields, arXiv, Dec. 18, 2018.

George Papandreou et al., PersonLab: Person pose estimation and instance segmentation with a bottom-up, part-based, geometric embedding model, arXiv, Mar. 22, 2018.

* cited by examiner

PARENT KEYPOINT ◀─────── CHILD KEYPOINT

APPARATUS FOR SEPARATING FEATURE POINTS FOR EACH OBJECT, METHOD FOR SEPARATING FEATURE POINTS FOR EACH OBJECT AND COMPUTER PROGRAM

CROSS-REFERENCE TO RELATED APPLICATIONS

This application is a 371 U.S. National Phase of International Application No. PCT/JP2020/006844, filed on Feb. 20, 2020. The entire disclosure of the above application is incorporated herein by reference.

TECHNICAL FIELD

The present invention relates to an object-specific keypoint separation apparatus, an object-specific keypoint separation method, and a computer program.

BACKGROUND ART

Techniques for estimating two-dimensional coordinates of keypoints such as joints, eyes, ears, and the nose of an object in an image captured by an imaging device such as a digital camera or a video camera for each object in the image and separating the keypoints for each object have been proposed. Machine learning using deep learning has been widely applied in such technical fields. For example, a known technique of separating keypoints for each object uses a pre-trained model for training heat maps each configured to have a peak at the coordinates at which each keypoint appears in the image and vector fields each describing the connection relationship of respective keypoints. Hereinafter, separating keypoints for each object will be referred to as object-specific keypoint separation.

Figure 7:
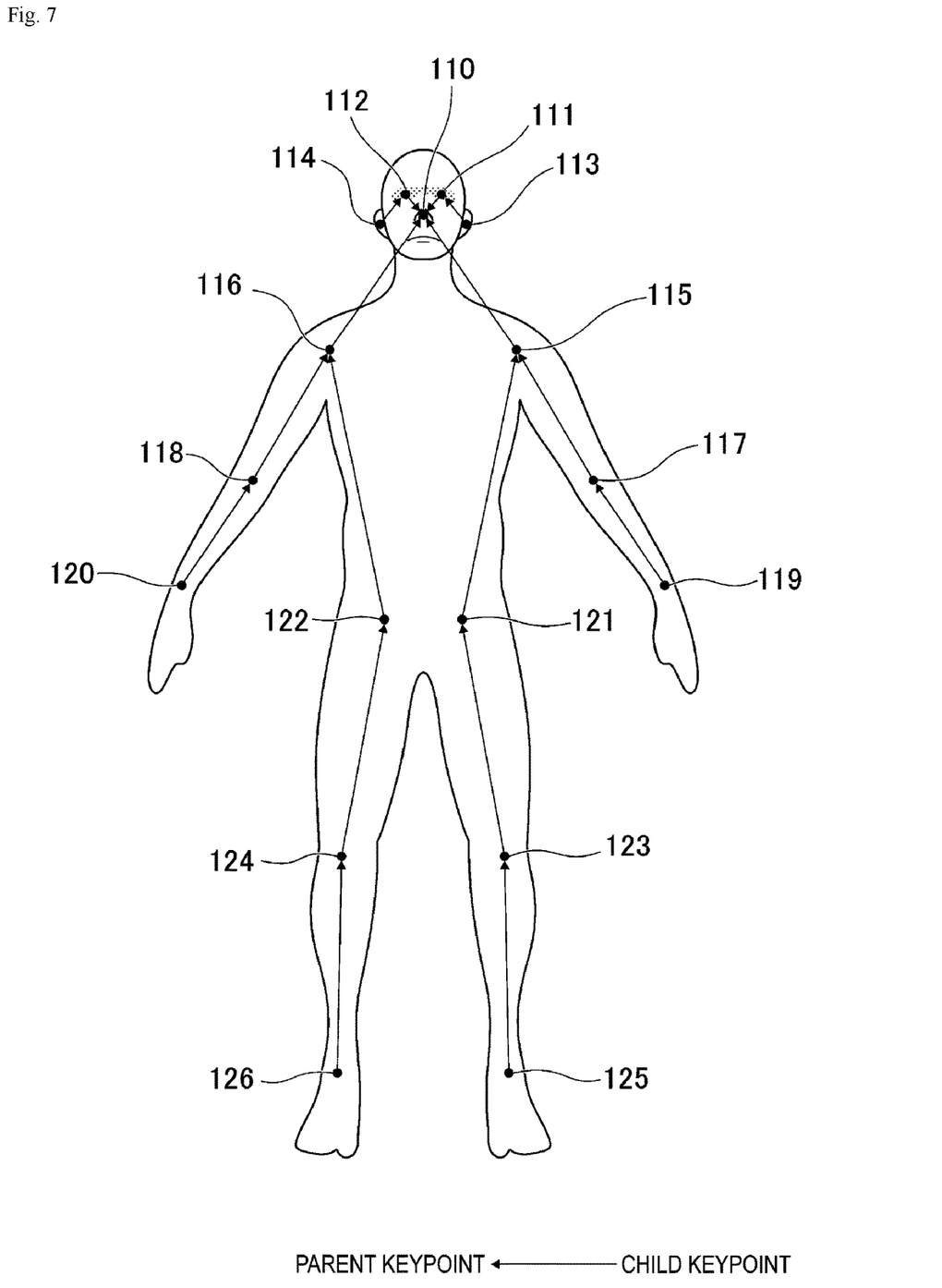
FIG. 7 is a diagram illustrating exemplary keypoints defined in the MS COCO dataset.

Keypoints of an object are described in a tree-like hierarchical structure as illustrated in FIG. 7. FIG. 7 illustrates exemplary keypoints defined in the Microsoft Common Object in Context (MS COCO) dataset. Training is performed for vector fields each describing the connection relationship of respective keypoints to generate a vector in the direction from a child keypoint to a parent keypoint in a hierarchical structure. A keypoint 110 is a keypoint representing the position of the nose. A keypoint 111 is a keypoint representing the position of the left eye. A keypoint 112 is a keypoint representing the position of the right eye. Keypoints 113 to 126 are keypoints representing the positions of other parts defined for the object.

A parent in a hierarchical structure represents a keypoint on the side close to the keypoint corresponding to the root in the hierarchical structure, and a child in the hierarchical structure represents a keypoint on the side far from the keypoint corresponding to the root in the hierarchical structure. In the example illustrated in FIG. 7, the keypoint corresponding to the root in the hierarchical structure is the keypoint 110. In this case of the hierarchical structure in which a first keypoint and a second keypoint are connected, the first keypoint close to the keypoint 110 is a parent, and the second keypoint far from the keypoint 110 is a child. For example, taking a keypoint 117 and a keypoint 119 shown in FIG. 7 as an example, the keypoint 117 is closer to the keypoint 110 than the keypoint 119 is. For this reason, the keypoint 117 is a parent keypoint, and the keypoint 119 is a child keypoint.

NPL 1 has proposed a technique to perform object-specific keypoint separation at a high speed in which vector fields describing the connection relationships of keypoints that are called part affinity fields are trained, and certainties of the connection relationships between the keypoints are calculated using a line integral of the vector fields.

NPL 2 has proposed a technique to increase accuracy in object-specific keypoint separation by using three vector fields and a mask. Specifically in NPL 2, first, a person segmentation mask, which masks object regions in an image in a silhouette shape, is generated in addition to three vector fields including short-range offsets, mid-range offsets, and long-range offsets. In NPL 2, next, the two vector fields of the short-range offsets and mid-range offsets are used to generate connection relationships of keypoints. Then, in NPL 2, the image is divided into regions corresponding to the number of persons who are objects using the short-range offsets, the long-range offsets, and the person segmentation mask. As a result, accuracy in object-specific keypoint separation is enhanced according to NPL 2. Further, in NPL 2, the vector field describing the connection relationship between parent and child keypoints is only mid-range offsets. The short-range offsets are a vector field for correction in which each keypoint is described to face the center. The long-range offsets are a vector field describing that the region surrounded by the person segmentation mask points to the coordinates of the nose of the object.

CITATION LIST

Non Patent Literature

NPL 1: Cao, Z., Hidalgo, G., Simon, T., Wei, S. E., Sheikh, Y., "OpenPose: Realtime Multi-Person 2D Pose Estimation using Part Affinity Fields", in arXiv preprint arXiv: 1812.08008, 2018.

NPL 2: G. Papandreou, T. Zhu, L.-C. Chen, S. Gidaris, J. Tompson, and K. Murphy, "PersonLab: Person Pose Estimation and Instance Segmentation with a Bottom-Up, Part-Based, Geometric Embedding Model", in arXiv: 1803.08225, 2018.

SUMMARY OF THE INVENTION

Technical Problem

In the techniques of the related art, the coordinates indicating the peak values in the heat map are the coordinates of keypoints. When an image captured using a recent high-resolution camera is received as an input to generate a heat map and a vector field with the equal resolution, a computational load increases. A huge amount of memory is required in deep learning to generate a heat map and a vector field with an equal resolution. Thus, it is difficult to implement a complex network. A computational load can be reduced if the output resolution of the heat map and vector field is reduced without changing the resolution of the input image. However, accuracy in estimation of keypoint coordinates deteriorates if the resolution is lowered.

In view of the above-described circumstances, the present invention aims to provide a technique capable of reducing accuracy deterioration in estimation of keypoints for object-specific keypoint separation while reducing a computational load.

Means for Solving the Problem

According to an aspect of the present invention, an object-specific keypoint separation apparatus includes: an inference execution unit configured to receive a captured image capturing an object as an input and use a pre-trained model that has been trained in order to output a plurality of first maps and a plurality of second maps generated from the input captured image to output the plurality of first maps and the plurality of second maps, the plurality of first maps storing a vector describing a connection relationship of a keypoint of the object only around the keypoint, and the plurality of second maps representing a heat map configured to have a peak at coordinates at which the keypoint of the object appears; a map correction unit configured to correct the plurality of second maps using the plurality of first maps and the plurality of second maps output from the inference execution unit; an upsampling unit configured to upsample the plurality of first maps output from the inference execution unit; and an object-specific keypoint separation unit configured to separate keypoints for each object based on the plurality of upsampled first maps and the plurality of corrected second maps.

According to another aspect of the present invention, an object-specific keypoint separation method includes: receiving a captured image capturing an object as an input and using a pre-trained model that has been trained in order to output a plurality of first maps and a plurality of second maps generated from the input captured image to output the plurality of first maps and the plurality of second maps, the plurality of first maps storing a vector describing a connection relationship of a keypoint of the object only around the keypoint, and the plurality of second maps representing a heat map configured to have a peak at coordinates at which the keypoint of the object appears; correcting the plurality of second maps using the plurality of output first maps and the plurality of output second maps; upsampling the plurality of output first maps; and separating the keypoints for each object based on the plurality of upsampled first maps and the plurality of corrected second maps.

According to an aspect of the present invention, a computer program causes a computer to function as the object-specific keypoint separation apparatus.

Effects of the Invention

According to the present invention, it is possible to reduce accuracy deterioration in estimation of keypoints for object-specific keypoint separation while reducing a computational load.

DESCRIPTION OF EMBODIMENTS

Embodiments of the present invention will be described below with reference to the drawings.

Figure 1:
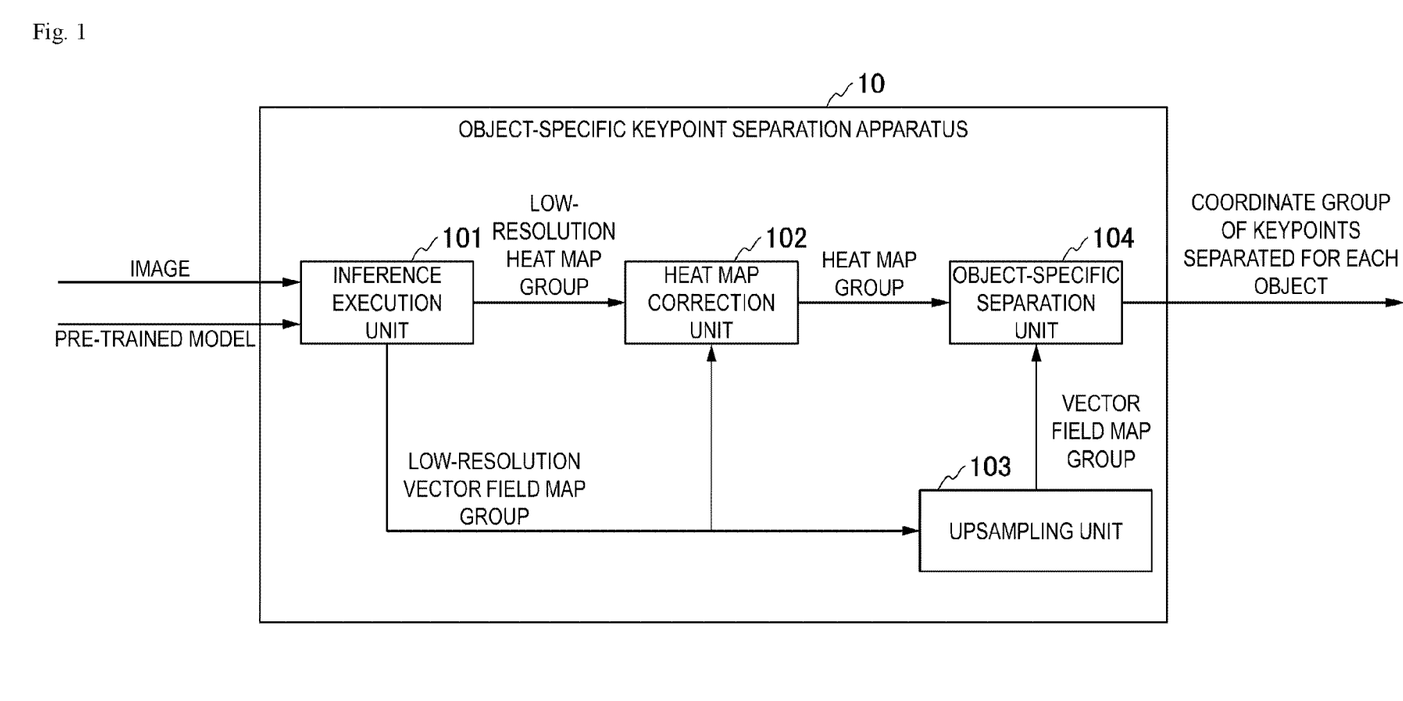
FIG. 1 is a block diagram illustrating a specific exemplary a functional configuration of an object-specific keypoint separation apparatus according to the present invention.

FIG. 1 is a block diagram illustrating a specific exemplary functional configuration of an object-specific keypoint separation apparatus 10 according to the present invention. The object-specific keypoint separation apparatus 10 is an apparatus that separates keypoints of objects that are persons captured in an image (hereinafter referred to as a "captured image") for each of the objects. More specifically, the object-specific keypoint separation apparatus 10 separates the keypoints for each of the objects using the captured image and a pre-trained model generated from machine learning. A keypoint of an object in the present embodiment is a part defined for an object such as a joint, an eye, an ear, and the nose of the object.

The pre-trained model in the present embodiment is model data trained to receive a captured image as an input and output a vector field map group with a low resolution and a heat map group with a low resolution. The vector field map group with a low resolution is a set of vector field maps with a low resolution (first maps) generated using the captured image and collected for all the keypoints. The heat map group with a low resolution is a set of heat maps with a low resolution (second maps) generated using the captured image and collected for all the keypoints. An operation using the pre-trained model will now be described. Specifically, first the pre-trained model generates a vector field map with a low resolution describing the connection relationship of keypoints of the object and a heat map with a low resolution for the keypoints from the input captured image. Thereafter, the pre-trained model outputs a vector field map group with a low resolution obtained from the generated vector field maps with a low resolution and a heat map group with a low resolution obtained from the generated heat maps with a low resolution. Here, a low resolution is a resolution that is lower than the resolution of the input image. A vector field with a low resolution map is a vector field map with a resolution lower than the resolution of the input image. A heat map with a low resolution is a heat map with a resolution lower than the resolution of the input image. In the following description, a vector field map group with a low resolution will be described as a low-resolution vector field map group, and a heat map group with a low resolution will be described as a low-resolution heat map group.

A vector field map shows a vector in the direction from a child keypoint to a parent keypoint. For example, a vector describing the connection relationship of keypoints of an object stored on a vector field map is only the vector around the keypoints. A heat map is a map having a peak at the coordinates at which a keypoint of an object appears. The heat map is similar to a heat map used in object-specific keypoint separation of the related art. The present invention is characterized in that a heat map obtained by upsampling a low-resolution heat map to have an equal resolution is corrected by a coordinate value indicated by a low-resolution vector field. Here, an equal resolution is the same resolution as that of the input image. The object-specific keypoint separation apparatus 10 is configured using an information processing apparatus, for example, a personal computer.

The object-specific keypoint separation apparatus 10 includes a central processing unit (CPU), a memory, an auxiliary storage device, and the like connected to one another through a bus and executes a program. Executing the program enables the object-specific keypoint separation apparatus 10 to function as an apparatus including an inference execution unit 101, a heat map correction unit 102, an upsampling unit 103, and an object-specific separation unit 104. Further, all or some functions of the object-specific keypoint separation apparatus 10 may be implemented using hardware such as an application specific integrated circuit (ASIC), a programmable logic device (PLD), or a field programmable gate array (FPGA). In addition, the program may be recorded on a computer-readable recording medium. The computer-readable recording medium is, for example, a portable medium such as a flexible disk, a magneto-optical disc, a ROM, or a CD-ROM, or a storage device such as a hard disk incorporated into a computer system. In addition, the program may be transmitted and/or received via an electrical communication line.

The inference execution unit 101 uses a captured image and a pre-trained model as an input. The inference execution unit 101 uses an input captured image and pre-trained model to output a low-resolution heat map group and a low-resolution vector field map group. The inference execution unit 101 outputs a low-resolution heat map group to the heat map correction unit 102, and outputs a low-resolution vector field map group to the heat map correction unit 102 and the upsampling unit 103.

The heat map correction unit 102 receives the low-resolution heat map group and the low-resolution vector field map group as an input. The heat map correction unit 102 uses the input low-resolution heat map group and low-resolution vector field map group to generate a heat map group with an equal resolution. In this way, the heat map correction unit 102 uses the input low-resolution heat map group and low-resolution vector field map group to correct the low-resolution heat map group. The heat map correction unit 102 outputs the generated heat map group to the object-specific separation unit 104. The heat map correction unit 102 is an aspect of a map correction unit.

The upsampling unit 103 receives the low-resolution vector field map group as an input. The upsampling unit 103 upsamples the input low-resolution vector field map group. For example, the upsampling unit 103 upsamples the input low-resolution vector field map group so that the low-resolution vector field map group has an equal resolution. The technique of bicubic interpolation may be used for upsampling. The upsampled low-resolution vector field map will be described as a vector field map. The upsampling unit 103 outputs a vector field map group to the object-specific separation unit 104.

The object-specific separation unit 104 receives the heat map group and the vector field map group as an input. The object-specific separation unit 104 uses the input heat map group and vector field map group to separate keypoints for each object. The object-specific separation unit 104 separates the keypoints set in a tree-shaped hierarchical structure for each object and outputs a coordinate group indicating the separation result (a coordinate group of the keypoints separated for each object) to the outside.

Figure 2:
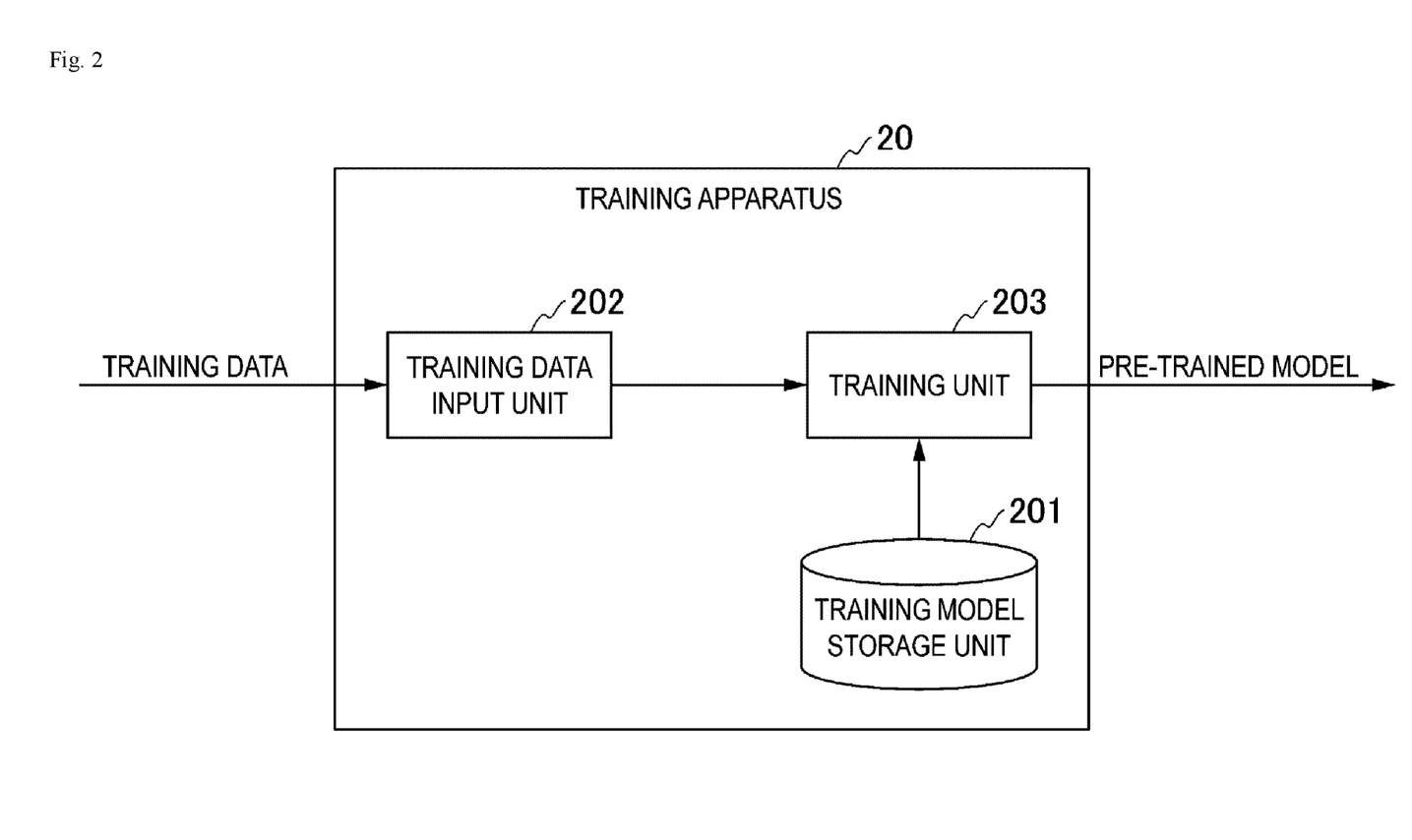
FIG. 2 is a block diagram illustrating a specific exemplary functional configuration of a training apparatus according to the present invention.

FIG. 2 is a block diagram illustrating a specific exemplary functional configuration of a training apparatus 20 according to the present invention.

The training apparatus 20 is an apparatus that generates a pre-trained model to be used by the object-specific keypoint separation apparatus 10. The training apparatus 20 is communicably connected to the object-specific keypoint separation apparatus 10.

The training apparatus 20 includes a CPU, a memory, an auxiliary storage device, and the like connected to one another through a bus and executes a program. Executing the program enables the training apparatus 20 to function as an apparatus including a training model storage unit 201, a training data input unit 202, and a training unit 203. Further, all or some functions of the training apparatus 20 may be realized using hardware such as an ASIC, a PLD, or an FPGA. In addition, the program may be recorded on a computer-readable recording medium. The computer-readable recording medium is, for example, a portable medium such as a flexible disk, a magneto-optical disc, a ROM, or a CD-ROM, or a storage device such as a hard disk incorporated in a computer system. In addition, the program may be transmitted and/or received via an electrical communication line.

The training model storage unit 201 is configured using a storage device such as a magnetic storage device or a semiconductor storage device. The training model storage unit 201 stores a training model for machine learning in advance. Here, the training model is information representing a machine learning algorithm used to train a relationship between input data and output data. Although there are various learning algorithms for supervised learning including various regression analysis methods, a decision tree, a k-nearest neighbor method, a neural network, a support vector machine, deep learning, and the like, a case in which deep learning is used will be described in the present embodiment. Further, for the learning algorithm, another training model described above may be used.

The training data input unit 202 has a function of randomly selecting samples from a plurality of pieces of input training data and outputting the selected samples to the training unit 203. The training data is data for learning used in supervised learning and is data represented by a combination of input data and output data that is assumed to be correlated with the input data. Here, the input data is a captured image, and the output data is a low-resolution heat map group and a low-resolution vector field map group for the keypoints paired with the captured image.

The training data input unit 202 is communicably connected to an external apparatus (not illustrated) storing a training data group and receives the training data group as an input from the external apparatus via the communication interface of the apparatus. In addition, for example, the training data input unit 202 may be configured to receive the training data group as an input by reading the training data group from a recording medium (for example, a universal serial bus (USB) memory, a hard disk, or the like) storing the training data group in advance.

The training unit 203 generates a pre-trained model by performing training so as to minimize a difference between a first set of a low-resolution heat map group for keypoints and a low-resolution vector field map group for the keypoints obtained by converting the captured image of the training data output from the training data input unit 202 in accordance with the training model and a second set of a low-resolution heat map group for the keypoints and a low-resolution vector field map group for the keypoints in the training data. The generated pre-trained model is input to the object-specific keypoint separation apparatus 10. Further, the input of the pre-trained model to the object-specific keypoint separation apparatus 10 may be performed through communication between the object-specific keypoint separation apparatus 10 and the training apparatus 20, or may be performed using a recording medium on which the pre-trained model has been recorded.

Figure 3:
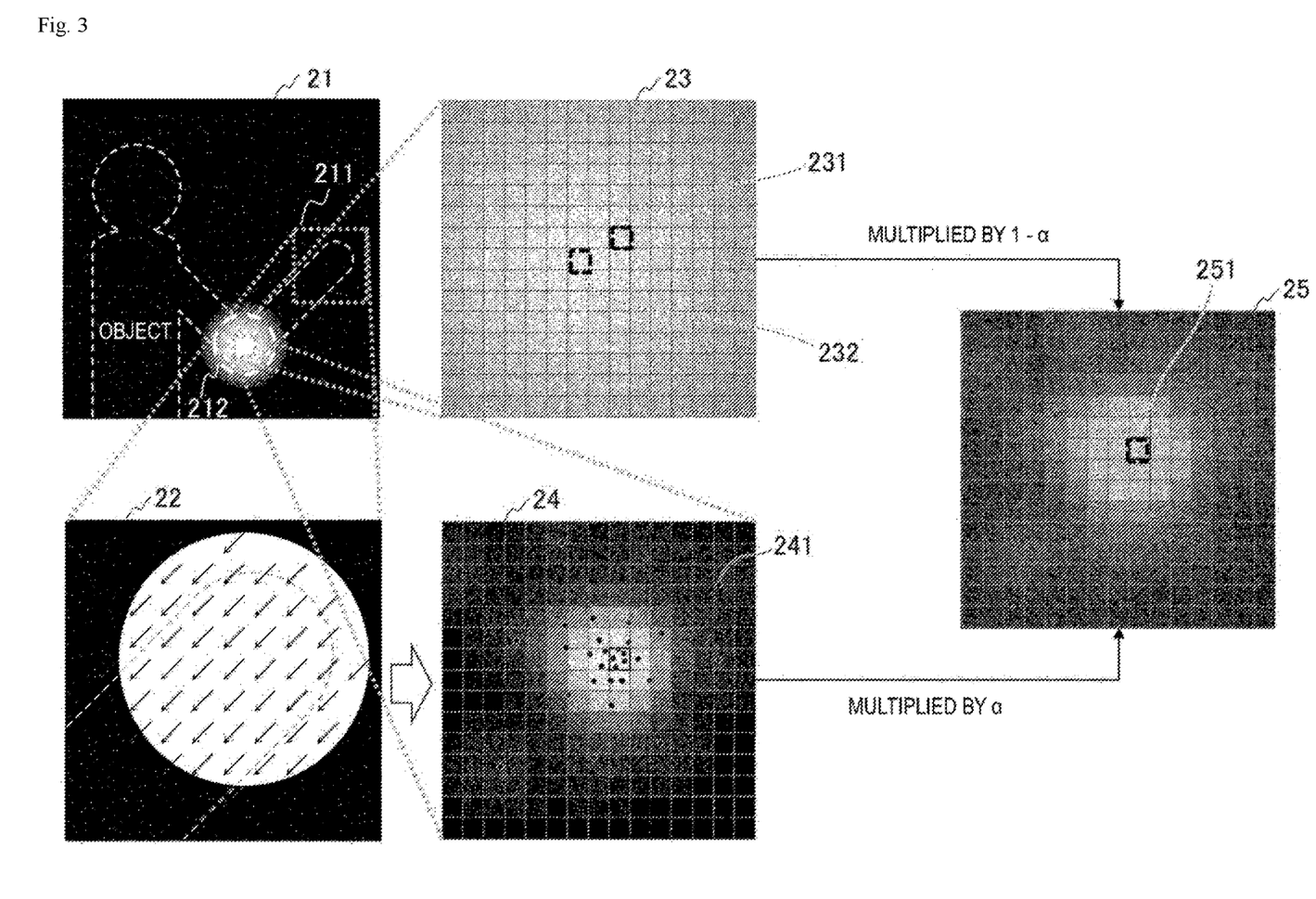
FIG. 3 is a diagram illustrating specific exemplary processing of an object-specific keypoint separation apparatus according to an embodiment.

FIG. 3 is a diagram illustrating specific exemplary processing of the object-specific keypoint separation apparatus 10 according to an embodiment. An image 21 illustrated in FIG. 3 is a low-resolution heat map of the right elbow of the low-resolution heat map group output from the inference execution unit 101. A region 211 in the image 21 is a region of the right wrist, and a region 212 is a region of the right elbow. Here, it is assumed that the right wrist is a child keypoint and the right elbow is a parent keypoint. In this case, a vector field map in the direction to the parent keypoint (right elbow) from the child keypoint (right wrist) is seen as in an image 22. The image 22 is a low-resolution vector field map of the low-resolution heat map group output from the inference execution unit 101 with the direction of the right elbow seen from the right wrist.

An image 23 in FIG. 3 represents a heat map obtained by upsampling the resolution of the region 212 of the right elbow to have the same resolution as that of the input image. It is assumed that the correct coordinates of the keypoints in the image 23 are coordinates indicated by a region 231 and the peak coordinates of the upsampled heat map are the coordinates indicated by a region 232. In a case in which the coordinates indicating the peak value when the low-resolution heat map is upsampled using bicubic interpolation deviates from the correct coordinates to a predetermined range or more, accuracy deteriorates in estimation of keypoint coordinates. Thus, in the present invention, a vector density map indicating a degree of vector density is generated from the vectors describing the connection relationships between the keypoints and the child keypoints, and the final keypoints are determined using the synthesis values with respect to the upsampled low-resolution heat map. As a result, the coordinates can be closer to the correct coordinates, and thus accuracy deterioration can be reduced in estimation of keypoint coordinates.

A vector density map 24 which indicates a degree of vector density from vectors describing the connection relationships between the keypoints and the child keypoints is generated from the low-resolution vector field map (image 22). A specific generation method for the vector density map 24 will be described below. A point 241 on the vector density map 24 represents the coordinates of the parent keypoint indicated by each vector on the low-resolution vector field map. In addition, the object-specific keypoint separation apparatus 10 multiplies each pixel of the image 23 (heat map) by the value of (1.0−α), and multiplies each pixel of the vector density map 24 by the value of α. Further, it is assumed that the synthesis ratio α for the vector density map 24 and the upsampled low-resolution heat map (image 23) is a variable value in accordance with a degree of vector density. For example, the value of a is set to be high (a value closer to 1) if the convergence density is significantly high (equal to or higher than a threshold value), and the value of a is set to be low (a value closer to 0) if the convergence density is low (lower than the threshold value). Then, the object-specific keypoint separation apparatus 10 acquires a final heat map 25 by adding the multiplication result. Then, a peak position 251 on the heat map 25 is the position of the keypoint. In the object-specific keypoint separation apparatus 10, a heat map group is generated by performing the above-described processing on the low-resolution heat map group output from the inference execution unit 101.

Figure 4:
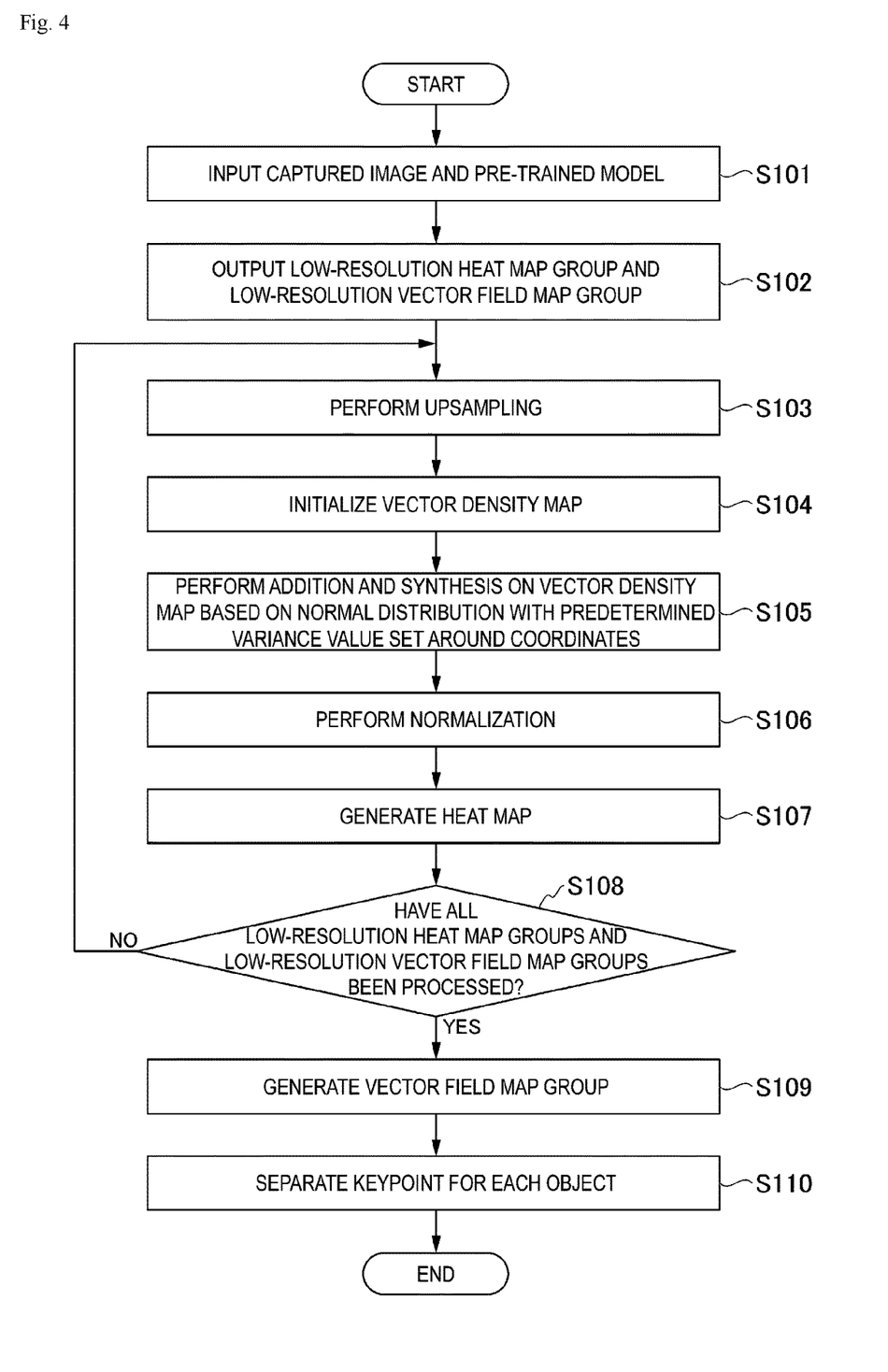
FIG. 4 is a flowchart showing processing of the object-specific keypoint separation apparatus according to the embodiment.

FIG. 4 is a flowchart showing the processing of the object-specific keypoint separation apparatus 10 according to the embodiment.

The inference execution unit 101 receives a captured image and a pre-trained model from the outside as an input (step S101). The captured image and the pre-trained model do not need to be input at the same timing. In a case in which the inference execution unit 101 has already acquired the pre-trained model from the training apparatus 20 before starting the processing of FIG. 4, the inference execution unit 101 receives only the captured image as an input in the processing of step S101.

Inputting the captured image into the pre-trained model that has been input causes the inference execution unit 101 to output a low-resolution heat map group and a low-resolution vector field map group of the object captured in the captured image (step S102). The inference execution unit 101 outputs the low-resolution heat map group to the heat map correction unit 102. The inference execution unit 101 outputs the low-resolution vector field map group to the heat map correction unit 102 and the upsampling unit 103.

The heat map correction unit 102 upsamples the low-resolution heat map group output from the inference execution unit 101 to be an image with the equal resolution (step S103). For example, the heat map correction unit 102 upsamples the low-resolution heat map group to be an image with the equal resolution using bicubic interpolation. The heat map correction unit 102 initializes a vector density map (step S104). That is, the heat map correction unit 102 initializes the value of each pixel of the vector density map to 0 to generate a vector density map group based on the low-resolution vector field map group.

The heat map correction unit 102 first selects one low-resolution heat map of the plurality of input low-resolution heat map groups. Next, the heat map correction unit 102 generates a vector density map using the selected low-resolution heat map and a low-resolution vector field map corresponding to the selected low-resolution heat map. Specifically, the heat map correction unit 102 performs addition and synthesis on the vector density map based on a normal distribution set with a predetermined variance value around the coordinates indicated by each vector on the low-resolution vector field map indicating the direction of the keypoints indicated by the low-resolution heat map (step S105).

Figure 5:
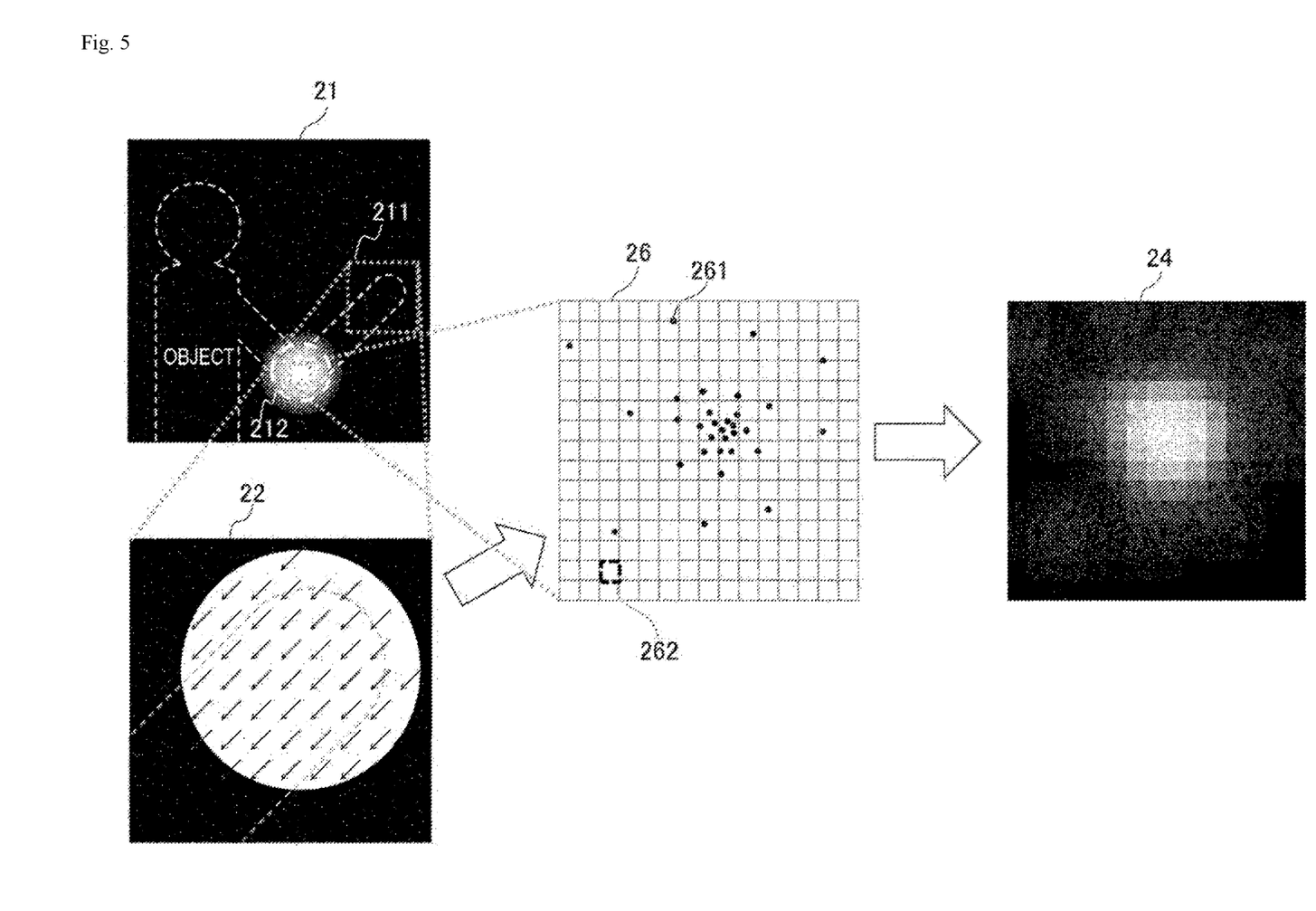
FIG. 5 is a diagram illustrating exemplary generation of a vector density map according to the embodiment.

FIG. 5 is a diagram illustrating exemplary generation of the vector density map according to the embodiment. The image 21 and the image 22 shown in FIG. 5 are the same images as those shown in FIG. 3. The heat map correction unit 102 generates an image 26 using the low-resolution vector field map shown as the image 22. A point 261 in the image 26 represents the coordinates of the parent keypoint indicated by each vector on the low-resolution vector field map. A region 262 in the image 26 represents coordinates on the map. Then, the heat map correction unit 102 calculates a coordinate value V assigned to each coordinate of the vector density map based on the following equation (1).

[Math. 1]

$$V = \sum_{n=1}^{N} e^{-\frac{\|P_n - C\|_2^2}{\sigma^2}} \quad (1)$$

In equation (1), N represents the number of coordinates of the parent keypoint indicated by each vector on the low-resolution vector field map, C represents respective coordinates of the vector density map, and $\sigma^2$ represents a known variance value. The heat map correction unit 102 assigns the calculated coordinate value V of respective coordinates to respective coordinates of the initialized vector density map to generate a vector density map. The vector density map generated in the processing is the image 24 in FIG. 5.

The heat map correction unit 102 performs normalization by dividing the value on the vector density map by the maximum value in the generated vector density map so that the maximum value is 1.0 (step S106). Thereafter, the heat map correction unit 102 multiplies the normalized vector density map and the upsampled heat map by a predetermined synthesis ratio, respectively.

The heat map correction unit 102 multiplies each pixel of the upsampled heat map by a value of (1.0−α) and multiplies each pixel of the vector density map by the value of a. For example, the heat map correction unit 102 compares differences between the average values of samples in a given distance from the coordinates indicating the peaks of the vector density map and the upsampled heat map and the peak values, and sets a value of a to 0.5 or greater if the difference value indicating the vector density map is greater than or equal to a threshold value.

Then, the heat map correction unit 102 adds and synthesizes one multiplied vector density map and one multiplied heat map to generate one final heat map (step S107). The heat map correction unit 102 outputs the generated heat map to the object-specific separation unit 104. The heat map correction unit 102 performs the processing of steps S103 to S107 on all of the low-resolution heat map groups and the low-resolution vector field map groups output from the inference execution unit 101. As a result, a plurality of heat map groups are output from the heat map correction unit 102 to the object-specific separation unit 104. The heat map correction unit 102 determines whether the processing of step S103 to step S107 has been performed on all of the low-resolution heat map groups and the low-resolution vector field map groups output from the inference execution unit 101 (step S108).

If the processing of step S103 to step S107 has been performed on all of the low-resolution heat map groups and the low-resolution vector field map groups output from the inference execution unit 101 (Yes in step S108), the object-specific keypoint separation apparatus 10 performs the processing of step S109.

On the other hand, if the processing of step S103 to step S107 has not been performed on all of the low-resolution heat map groups and the low-resolution vector field map groups output from the inference execution unit 101 (No in step S108), the object-specific keypoint separation apparatus 10 performs the processing of step S103 to step S107 on the low-resolution heat maps and the low-resolution vector field maps that have not been processed.

The upsampling unit 103 upsamples all of the low-resolution vector field map groups output from the inference execution unit 101 to be an image with the equal resolution (step S109). For example, the upsampling unit 103 upsamples the low-resolution vector field map groups to be an image with the equal resolution using bicubic interpolation. The upsampling unit 103 outputs the upsampled vector field map groups to the object-specific separation unit 104.

The object-specific separation unit 104 uses the heat map groups output from the heat map correction unit 102 and the vector field map groups output from the upsampling unit 103 to separate the keypoints for each object (step S110). The object-specific separation unit 104 outputs a coordinate group of the keypoints separated for each object.

According to the object-specific keypoint separation apparatus 10 configured as described above, it is possible to reduce accuracy deterioration in estimation of a keypoint in object-specific keypoint separation while reducing a computational load. Specifically, the object-specific keypoint separation apparatus 10 outputs a low-resolution heat map group and a low-resolution vector field map group using the input image. In addition, the object-specific keypoint separation apparatus 10 corrects a heat map group obtained by upsampling a low-resolution heat map group to have the equal resolution with a coordinate value indicated by a low-resolution vector field map. As a result, even in a case in which an image captured using a high-resolution camera is input, a heat map with the equal resolution and a vector field map are not generated. Therefore, a computational load can be reduced. Furthermore, the object-specific keypoint separation apparatus 10 generates a vector density map indicating a degree of vector density from vectors each describing a connection relationship between a keypoint and a child keypoint, determines a final keypoint using a synthesis value with respect to the upsampled low-resolution heat map, and thus the coordinates of the keypoint can be closer to the correct coordinates. As a result, accuracy deterioration can be reduced in estimation of the keypoint coordinates.

Modified Example

The object-specific keypoint separation apparatus 10 and the training apparatus 20 may be configured to be integrated. Specifically, the object-specific keypoint separation apparatus 10 may be configured to have the learning function of the training apparatus 20. With this configuration, the object-specific keypoint separation apparatus 10 has a learning mode and an inference mode, and performs operations corresponding to each of the modes. Specifically, in the learning mode, the object-specific keypoint separation apparatus 10 generates a pre-trained model by performing the same processing as that performed by the training apparatus 20. In the inference mode, the object-specific keypoint separation apparatus 10 executes the processing shown in FIG. 4 using the generated pre-trained model.

The processing of step S105 in FIG. 4 above may be performed in other ways. For example, for each coordinate on the vector density map, $1.0/\tau L$, which is the reciprocal of the sum $\Sigma L$ of the distances L between the coordinates indicated by each vector on the low-resolution vector field map and the correct coordinates of the keypoints, and the like may be used.

Figure 6:
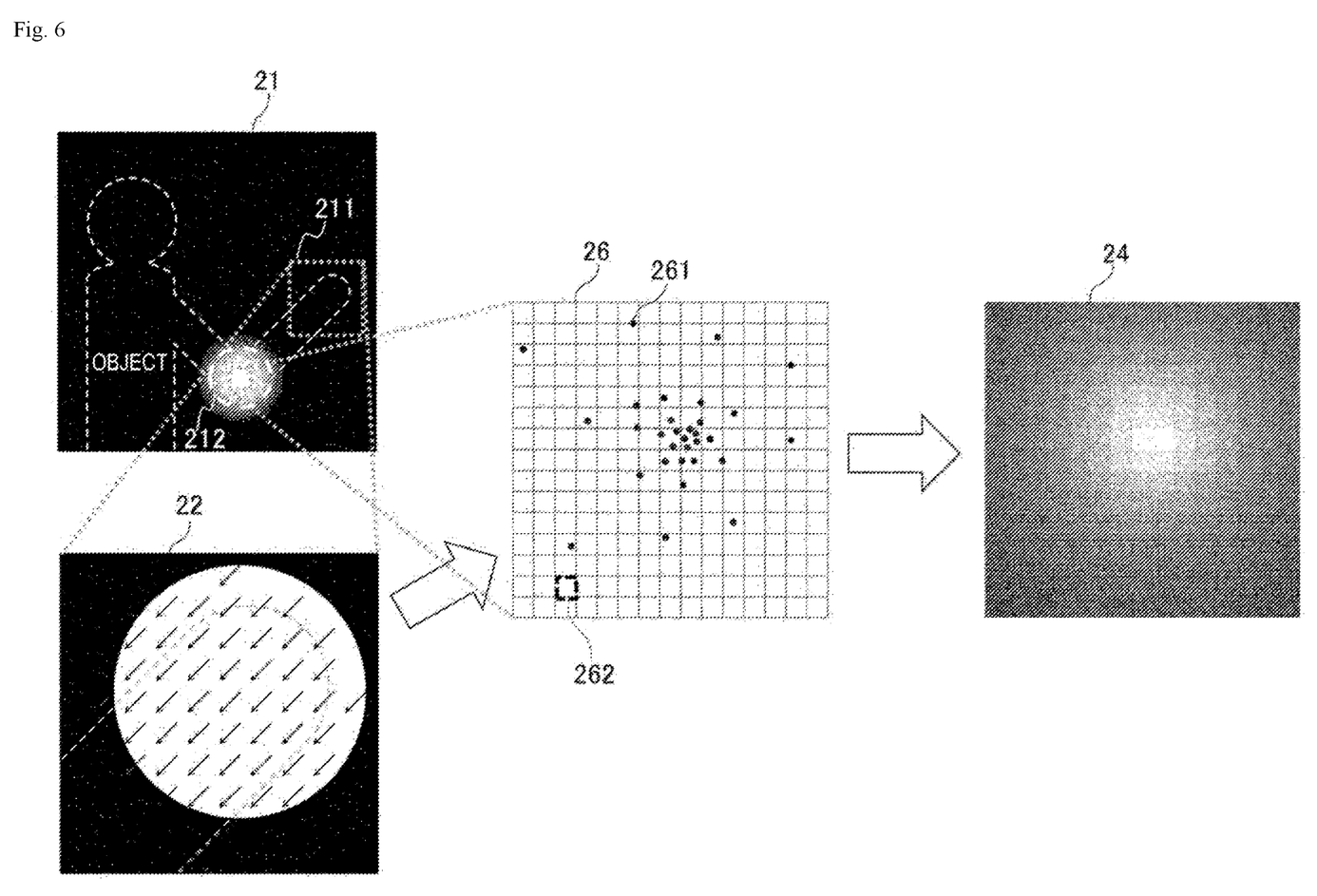
FIG. 6 is a diagram illustrating exemplary generation of a vector density map.

FIG. 6 is a diagram illustrating exemplary generation of a vector density map. The image 21 and the image 22 shown in FIG. 6 are the same images as those shown in FIG. 3. The heat map correction unit 102 generates an image 26 using the low-resolution vector field map shown as the image 22. Then, the heat map correction unit 102 calculates a coordinate value V assigned to respective coordinates of the vector density map based on the following equation (2).

[Math. 2]

$$V = \sum_{n=1}^{N} \frac{1.0}{\|P_n - C\|_2} \quad (2)$$

As such, the processing of step S105 in FIG. 4 can be substituted with a method of scaling the density of vectors.

Although the example in which accuracy deterioration is reduced in estimation of keypoint coordinates even in a situation where a low-resolution heat map and a low-resolution vector field map are used has been described in the embodiments described above, a vector density map may be used to improve accuracy in estimation of a heat map with an equal resolution by using a heat map with an equal resolution and a vector field with an equal resolution.

INDUSTRIAL APPLICABILITY

The present invention can be applied to a technology to separate keypoints of objects detected from an image capturing the objects for each object.

REFERENCE SIGNS LIST

10 Object-specific keypoint separation apparatus
20 Training apparatus
101 Inference execution unit
102 Heat map correction unit
103 Upsampling unit
104 Object-specific separation unit
201 Training model storage unit
202 Training data input unit
203 Training unit

The invention claimed is:

1. An object-specific keypoint separation apparatus comprising:
a processor; and
a storage medium having computer program instructions stored thereon, when executed by the processor, perform to:
receive a captured image capturing an object as an input and use a pre-trained model that has been trained in order to output a plurality of first maps and a plurality of second maps generated from the input captured image to output the plurality of first maps and the plurality of second maps, the plurality of first maps storing a vector describing a connection relationship of a keypoint of the object only around the keypoint, and the plurality of second maps representing a heat map configured to have a peak at coordinates at which the keypoint of the object appears;
correct the plurality of second maps using the plurality of first maps and the plurality of second maps output from the inference execution unit;
upsample the plurality of first maps; and
separate keypoints for each object based on the plurality of upsampled first maps and the plurality of corrected second maps.

2. The object-specific keypoint separation apparatus according to claim 1, wherein the plurality of first maps and the plurality of second maps output have a low resolution, and wherein the computer program instructions further perform to upsamples the plurality of second maps to cause the plurality of second maps to have an equal resolution.

3. The object-specific keypoint separation apparatus according to claim 2, wherein the computer program instructions further uses coordinates of a keypoint indicated by a vector on the first map to generate a vector density map representing a degree of vector density, and normalizes the vector density map by dividing a value on the vector density map by a maximum value on the generated vector density map.

4. The object-specific keypoint separation apparatus according to claim 3, wherein the computer program instructions further perform to multiplies the normalized vector density map and each of the plurality of upsampled second maps by a predetermined percentage value and adds up multiplication results to generate the plurality of corrected second maps.

5. An object-specific keypoint separation method comprising:
receiving a captured image capturing an object as an input and using a pre-trained model that has been trained in order to output a plurality of first maps and a plurality of second maps generated from the input captured image to output the plurality of first maps and the plurality of second maps, the plurality of first maps storing a vector describing a connection relationship of a keypoint of the object only around the keypoint, and the plurality of second maps representing a heat map configured to have a peak at coordinates at which the keypoint of the object appears;
correcting the plurality of second maps using the plurality of output first maps and the plurality of output second maps;
upsampling the plurality of output first maps; and
separating the keypoints for each object based on the plurality of upsampled first maps and the plurality of corrected second maps.

6. A non-transitory computer-readable medium having computer-executable instructions that, upon execution of the instructions by a processor of a computer, cause the computer to function as the object-specific keypoint separation apparatus according to claim 1.

* * * * *